United States Patent
Tee et al.

(10) Patent No.: US 9,913,276 B2
(45) Date of Patent: *Mar. 6, 2018

(54) PROVIDING A DOWNLINK CONTROL STRUCTURE IN A FIRST CARRIER TO INDICATE INFORMATION IN A SECOND, DIFFERENT CARRIER

(71) Applicant: Apple Inc., Cupertino, CA (US)

(72) Inventors: Lai King Tee, San Jose, CA (US); Yi Song, Plano, TX (US); Jun Li, Richardson, TX (US); Yuqiang Tang, Plano, TX (US); Neng Wang, Plano, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,979

(22) Filed: Oct. 17, 2016

(65) Prior Publication Data

US 2017/0034828 A1 Feb. 2, 2017

Related U.S. Application Data

(63) Continuation of application No. 13/974,589, filed on Aug. 23, 2013, now Pat. No. 9,485,755, which is a
(Continued)

(51) Int. Cl.
*H04W 72/04* (2009.01)
*H04L 5/00* (2006.01)
*H04W 48/16* (2009.01)

(52) U.S. Cl.
CPC ......... *H04W 72/0453* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

| | | |
|---|---|---|
| 7,317,917 B2 | 1/2008 | Qian et al. |
| 8,005,039 B2 | 8/2011 | Kamuf et al. |
| (Continued) | | |

FOREIGN PATENT DOCUMENTS

| | | |
|---|---|---|
| CN | 1679364 | 10/2005 |
| CN | 101507341 | 8/2009 |
| (Continued) | | |

OTHER PUBLICATIONS

NTT Docomo, "DL Layered Control Signal Structure in LTE-Advanced," 3GPP TSG RAN WG1 Meeiing #54bis, RI-083681, Sep. 29-Oct. 3, 2008, Prague , Czech Republic, retrieved from <http://www.3gpp.org/ftp/tsg_ran/WG1_RL.1/TSGR1_54b/Docs/RI-083681.zip>. pp. 1-6.
(Continued)

*Primary Examiner* — Candal Elpenord
(74) *Attorney, Agent, or Firm* — Meyertons, Hood, Kivlin, Kowert & Goetzel, P.C.

(57) ABSTRACT

A mobile station receives a downlink control structure in a first carrier, where the downlink control structure indicates that control information for the mobile station is on a second, different carrier. The mobile station decodes the control information in the second carrier, where the control information specifies resource allocation of a wireless link for the mobile station. More specifically, according to some implementations, the control channel in the first carrier specifies the resource allocation for an extended control channel in the second carrier, where the extended control channel specifies the resource allocation for traffic data of a wireless link for the mobile station.

20 Claims, 4 Drawing Sheets

Related U.S. Application Data continuation of application No. 13/125,199, filed as application No. PCT/US2009/063266 on Nov. 4, 2009, now Pat. No. 8,520,621.

(60) Provisional application No. 61/111,034, filed on Nov. 4, 2008.

(52) U.S. Cl.
CPC ......... *H04L 5/0094* (2013.01); *H04W 72/042* (2013.01); *H04W 72/0406* (2013.01); *H04W 48/16* (2013.01)

(56) References Cited

U.S. PATENT DOCUMENTS

| | | | |
|---|---|---|---|
| 8,094,701 | B2 | 1/2012 | Cozzo |
| 8,514,793 | B2 * | 8/2013 | Gauvreau ........... H04W 72/048 370/329 |
| 8,743,757 | B2 | 6/2014 | Yamada et al. |
| 8,811,269 | B2 | 8/2014 | Papsakellarion et al. |
| 2006/0079264 | A1 | 4/2006 | Gu et al. |
| 2008/0085718 | A1 | 4/2008 | Kuchibhotla et al. |
| 2008/0130486 | A1 | 6/2008 | Lim et al. |
| 2008/0159223 | A1 | 7/2008 | Palat et al. |
| 2008/0159323 | A1 | 7/2008 | Rinne et al. |
| 2009/0143072 | A1 | 6/2009 | Montojo et al. |
| 2009/0168704 | A1 | 7/2009 | Lee et al. |
| 2009/0298493 | A1 | 12/2009 | Lin |
| 2010/0087202 | A1 | 4/2010 | Ventola et al. |
| 2010/0165847 | A1 | 7/2010 | Kamuf et al. |
| 2010/0227569 | A1 | 9/2010 | Bala et al. |
| 2011/0064159 | A1 | 3/2011 | Ko et al. |
| 2011/0110296 | A1 | 5/2011 | Malladi et al. |
| 2011/0199995 | A1 | 8/2011 | Ito et al. |
| 2011/0205995 | A1 | 8/2011 | Grovlen |
| 2012/0076078 | A1 | 3/2012 | Han et al. |

FOREIGN PATENT DOCUMENTS

| | | |
|---|---|---|
| JP | 2007336496 | 12/2007 |
| KR | 1020070093657 | 5/2009 |
| KR | 1020080073645 | 8/2014 |
| WO | 2008126604 | 10/2008 |
| WO | 2010013960 | 2/2010 |
| WO | 2010047166 | 4/2010 |
| WO | 2010051209 | 5/2010 |

OTHER PUBLICATIONS

Philips. "Mitigating effect of false positive uplink grants," 3GPP TSG RAN WG1 Meeting #54, Jeju, Korea, Aug. 1-22, 2008, RJ-082792, retrieved from <http://3gpp.org/ftp/tsg_ran/WG1_RL1/TSGR1_54/Docs/R1-082792.zip> pp. 1-5.

Nokia Siemens Network, "LI control signaling with carrier aggregation in LTE-Advanced," 3GPP TSG-RAN WG1 Meeting #54bis, Prague, Czech Republic, Sep. 29-Oct. 3, 2008, RI-083730, retrieved from <ht1p://www. 3gpp.org/ftp/tsg_ran/WG1_RL1/TSGR1_54b/Docs/R1-08370.zip>, pp. 1-6.

Ericsson, "Mapping from CCE index to PUCCH resource TDD," 3GPP TSG-RAN WG1 #53bis, Warsaw, Poland, Jun. 23-27, 2008, R1-082463, retrieved from <http:fl www.3gpp.org/ftp/tsg_ran/WG1_RL1/TSGR1_53b/Docs/R1-082463. zip>, pp. 1-3.

International Search Report and Written Opinion dated Jun. 29, 2010 for International Application No. PCT/US2009/063266, International Filing Date: Nov. 4, 2009, pp. 1-11.

"General Control Channel Design for LTE-A" 3GPP TSG-RAN WG1 #54 R1-082848, Aug. 22, 2008, pp. 1-3.

"Carrier Aggregation in LTE-Advanced" 3GPP TSG-RAN WG1 #53bis R1-082468, Jun.-Jul. 2008, pp. 1-6.

Office Action from Chinese Patent Application No. 200980152801.7, dated Sep. 2, 2013, (English Translation and Chinese Versions), pp. 1-16.

Office Action from Chinese Application No. 200980152801.7, dated Oct. 8, 2014, English and Chinese versions, pp. 1-22.

Office Action from Japanese Application No. 201476102, dated Oct. 27, 2014, English and Japanese versions, pp. 1-21.

Office Action, Korean Application No. 10-2011-7012524, dated Dec. 28, 2015, 5 pages.

Office Action, Korean Application No. 10-2014-7008676, dated Apr. 28, 2016, 7 pages.

ZTE, "General control channel design for LTE-A," 3GPP TSG-RAN WG1 Meeting #54bis R1-083609 (Sep. 29, 2008), 3 pages.

Ericsson, "Carrier aggregation," 3GPP TSG-RAN WG1 Meeting #54bis R1-083750 (Sep. 29, 2008), 4 pages.

3GPP TS 36.213 v. 8.4.0 (Sep. 24, 2008), 62 pages.

ZTE, "General control channel design for LTE-A," 3GPP TSG-RAN WG1 Meeting #54bis R1-082848 (Aug. 22, 2008), 3 pages.

Communication of the European Search Report for Application No. 09825355.2, dated May 11, 2016, 8 pages.

Office Action for Japanese Application No. 2015-211613, dated Sep. 2, 2016, pp. 1-9.

Qualcomm Europe, "Carrier Aggregation Operation in LTE-Advanced", 3GPP TSG-RAN WG1 #54bis, R1-083811, Sep. 29-Oct. 3, 2008, Prague, Czech Republic, pp. 1-5.

* cited by examiner

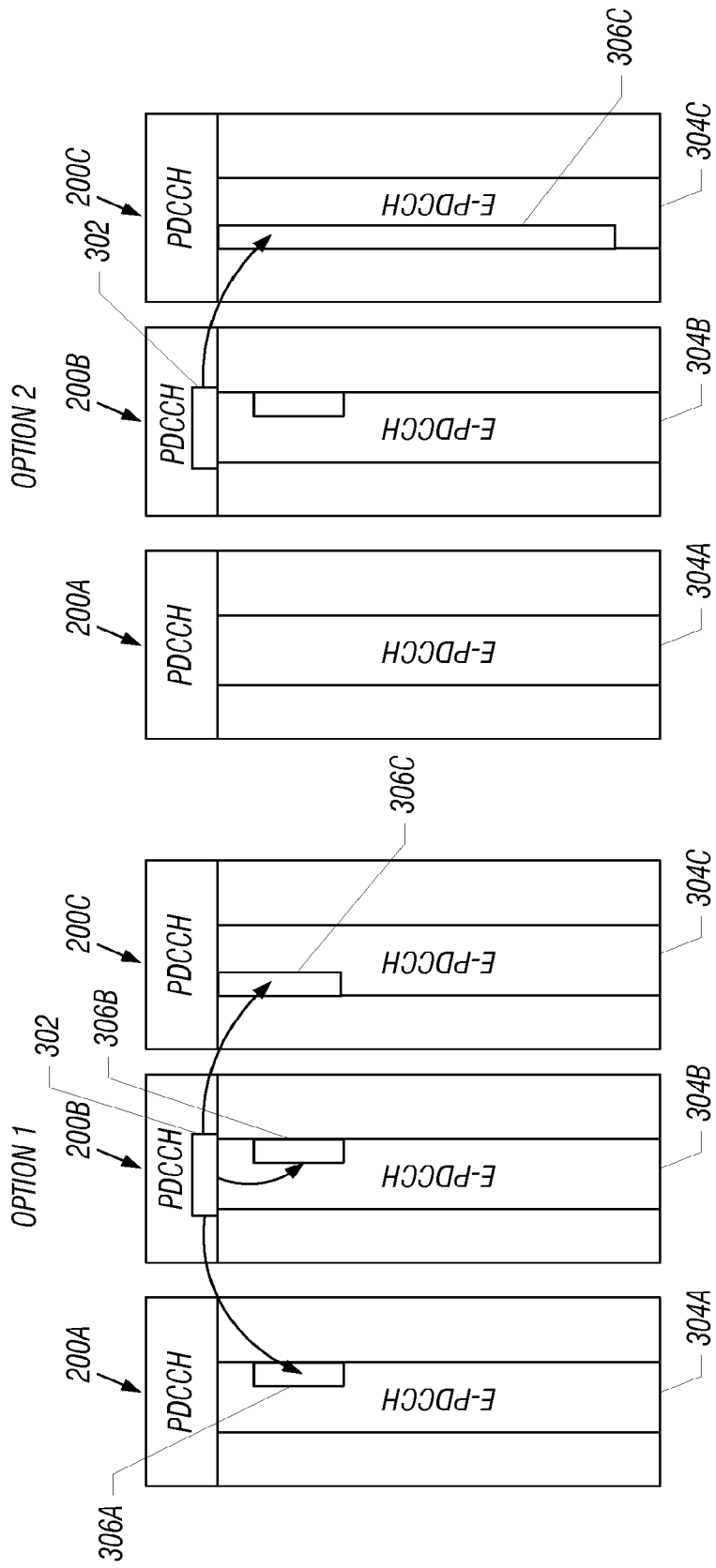

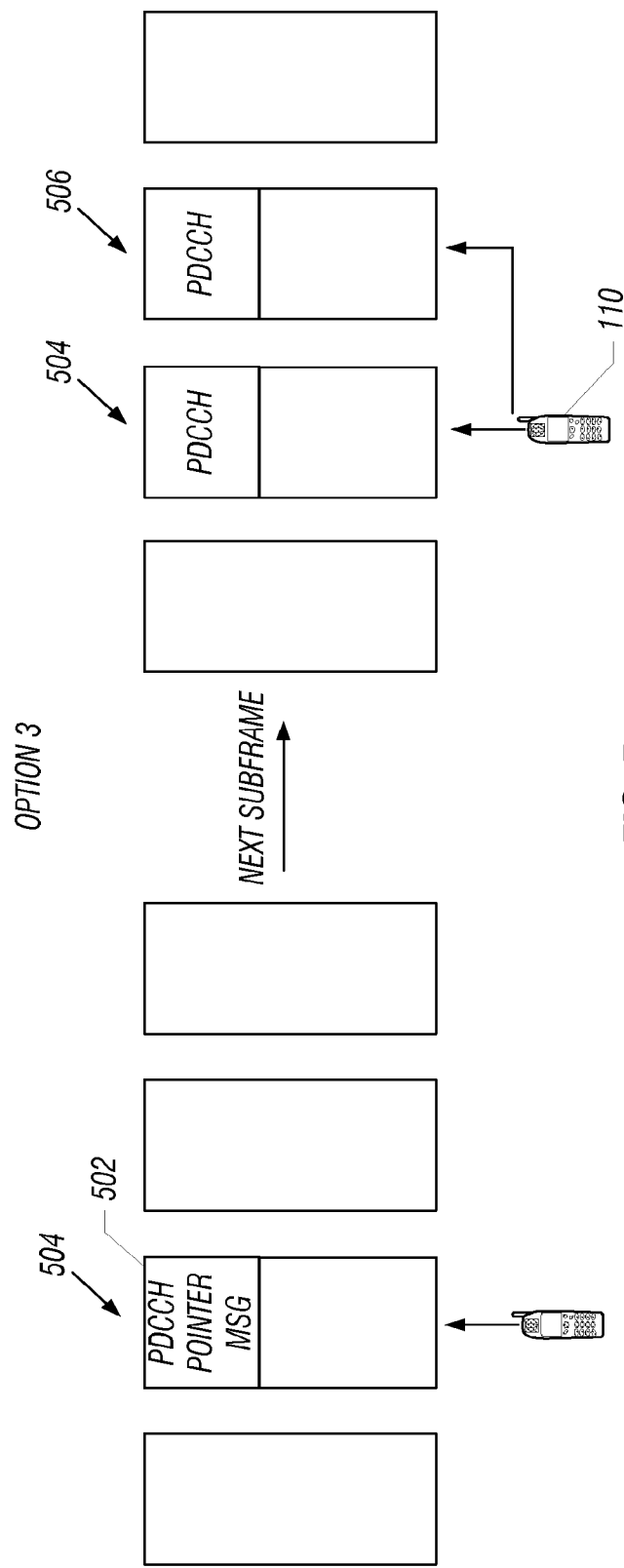

PROVIDING A DOWNLINK CONTROL STRUCTURE IN A FIRST CARRIER TO INDICATE INFORMATION IN A SECOND, DIFFERENT CARRIER

CROSS-REFERENCE TO RELATED APPLICATIONS

This application is a continuation of U.S. patent application Ser. No. 13/974,589, filed Aug. 23, 2013, which is a continuation of U.S. Patent Application Ser. No. 13/125,199, filed Jul. 20, 2011, now U.S. Pat. No. 8,520,621, which is a submission under 35 U.S.C. §371 for U.S. National Stage Patent Application of International Application No. PCT/US 09/63266, filed Nov. 4, 2009, which claims priority to U.S. Provisional Application Ser. No. 61/111,034, filed Nov. 4, 2008, the entirety of which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS technology. The LTE standard is also referred to as the EUTRA (Evolved Universal Terrestrial Radio Access) standard.

More recent developments of LTE have proposed the use of multiple component carriers to increase the available bandwidth of wireless communications. Each component carrier can have a frequency bandwidth of up to 20 megahertz (MHz). Multiple component carriers are aggregated together to increase the overall bandwidth available to user equipment. Each component carrier appears as an LTE carrier to a mobile station.

An issue associated with using multiple component carriers is that a mobile station may have to perform blind decoding of PDCCH (physical downlink control channel) in multiple component carriers to find relevant control information for the mobile station. Such blind decoding may cause wasteful power consumption at the mobile station.

SUMMARY

In general, according to an embodiment, a method for wireless communication comprises receiving, by a mobile station, a downlink control structure in a first carrier, where the downlink control structure indicates that control information for the mobile station is on a second, different carrier. The mobile station decodes the control information on the second carrier, where the control information specifies resource allocation of a wireless link for the mobile station.

Other or alternative features will become apparent from the following description, from the drawings, and from the claims.

BRIEF DESCRIPTION OF THE DRAWINGS

Some embodiments of the invention are described with respect to the following figures:

FIG. 3 illustrates an example in which a PDCCH in one carrier points to multiple E-PDCCHs in multiple carriers, in accordance with an embodiment;

FIG. 4 illustrates a PDCCH in one carrier that points to a single E-PDCCH in another carrier, according to another embodiment;

FIG. 5 illustrates an arrangement in which a carrier pointer message in one carrier points to control information in multiple carriers, according to a further embodiment.

DETAILED DESCRIPTION

Figure 1:
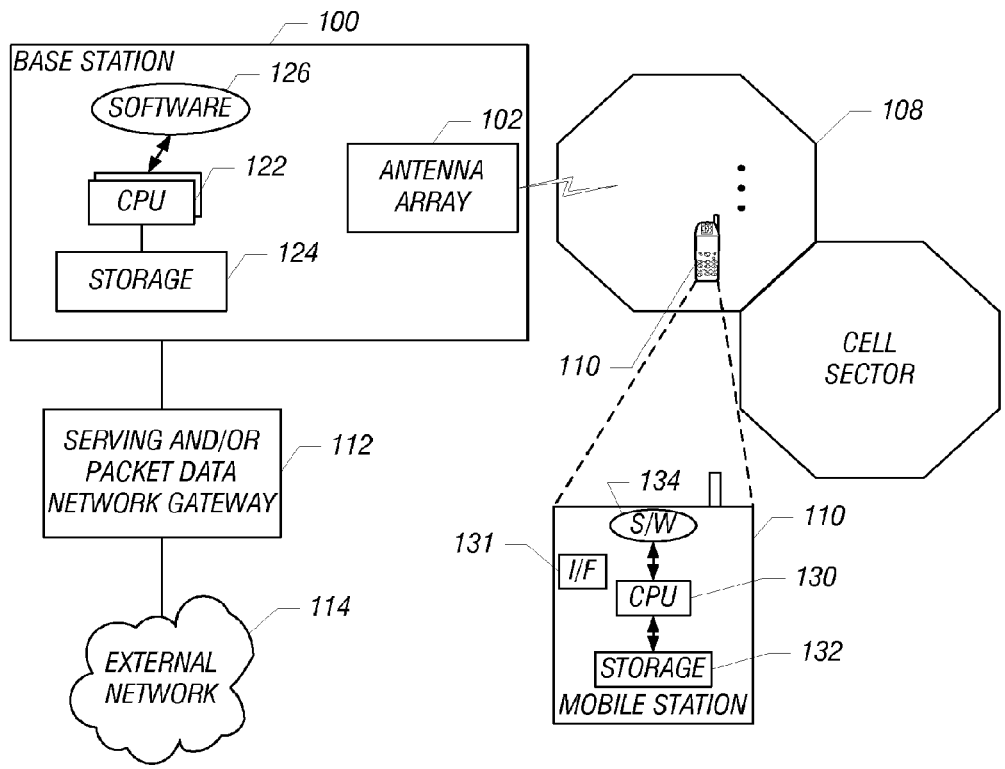
FIG. 1 is a block diagram of an example communications network that incorporates an embodiment of the invention.

In accordance with some preferred embodiments, a technique or mechanism is provided in which a downlink control structure is provided in a first carrier, where the downlink control structure indicates that control information for a mobile station is on a second, different carrier. The downlink control structure can identify a location of the control information on the second carrier, and the downlink control structure can also specify the size of the control information on the second carrier.

Multiple different carriers, including the first and second carriers, are aggregated to provide an overall bandwidth for wireless communications that is larger than the bandwidth provided by any of the individual carriers. The mobile station decodes the control information on the second carrier, where the control information specifies resource allocation (and other control-related aspects) of a wireless link for the mobile station.

In accordance with some embodiments, the wireless communications technology that is used is according to the Long Term Evolution (LTE) or EUTRA (Evolved Universal Terrestrial Radio Access) standard from 3GPP (Third Generation Partnership Project), which is an enhancement of the UMTS (Universal Mobile Telecommunications System) wireless technology. Reference to an LTE (or EUTRA) wireless communications network refers to the wireless communications network that conforms to the requirements of the LTE (or EUTRA) standard developed by 3GPP, as that standard currently exists or as the standard evolves over time. Note that LTE (or EUTRA) can refer to the current LTE (or EUTRA) standard, or to modifications of the LTE (or EUTRA) standard that are made over time. It is expected that in the future a standard that has evolved from LTE (or EUTRA) may be referred to by another name. It is contemplated that the term "LTE" or "EUTRA" as used herein is intended to cover such future standards as well. In alternative embodiments, wireless communications technologies according to other standards can be employed.

In the LTE context, the downlink control structure in a first carrier that points to control information in at least a second carrier is in a portion of a legacy PDCCH (physical downlink control channel) region. The legacy PDCCH region could be the first few OFDM (orthogonal frequency division multiplex) symbols of an LTE Release 8 subframe that are used for transmission of PDCCHs. In some embodiments, the portion of the legacy PDCCH region containing the downlink control structure has a predefined compact DCI (downlink control information) format. The control information in the second carrier can be in the form of an extended PDCCH (E-PDCCH). The mobile station decodes the E-PDCCH to obtain resource allocations (and other control information) for the mobile station.

The downlink control structure in the legacy PDCCH region is also referred to as the primary PDCCH, and the primary PDCCH is carried in an anchor carrier that a given mobile station monitors for obtaining control information. Based on detecting the primary PDCCH, the mobile station can easily identify another carrier that contains the E-PDCCH, which the mobile station can then decode to obtain additional control information, including resource allocation, information indicating a modulation and coding scheme (MCS) (to specify the modulation and coding to apply to traffic data), information relating to a HARQ (hybrid automatic repeat request) process (which specifies the addition of error correction information to a message for error detection and correction), information relating to a redundancy version (RV) (which is an HARQ parameter used with incremental redundancy to inform which retransmission version is used), power control information, and/or other control information. Legacy PDCCH can also be carried by other carriers to support legacy mobile stations.

FIG. 1 shows an example wireless network in which some embodiments of the invention can be provided. The wireless network includes a base station 100 that includes an antenna array or other antenna assembly 102 for sending wireless signals into a cell sector 108. A cell sector is one section of a cell of a cellular network. In alternative implementations, element 108 can represent an entire cell. More generally, a "cell segment" refers to either a cell or a cell sector.

Although just one base station is depicted in FIG. 1, it is noted that a wireless network would typically include multiple base stations. In some embodiments, the wireless network is an LTE wireless network.

In an LTE wireless network, the base station 100 is an enhanced node B ("eNode B"), which includes a base transceiver station that includes the antenna array 102. The base station 100 may also include a radio network controller that cooperates with the enhanced node B. The radio network controller and/or enhanced node B can perform one or more of the following tasks: radio resource management, mobility management for managing mobility of mobile stations, routing of traffic, and so forth. Note that one radio network controller can access multiple eNode Bs, or alternatively, an eNode B can be accessed by more than one radio access controller.

More generally, the term "base station" can refer to a cellular network base station, an access point used in any type of wireless network, or any type of wireless transmitter to communicate with mobile stations.

As depicted in FIG. 1, the base station 100 includes one or more central processing units (CPUs) 122, which is (are) connected to storage 124. Moreover, the base station 100 includes software 126 that is executable on the CPU(s) 122 to perform tasks of the base station 100.

The mobile station 110 of FIG. 1 also includes one or more CPUs 130 that are connected to storage 132. The mobile station 110 also includes software 134 that is executable on the CPU(s) 130 to perform tasks of the mobile station 110. In addition, the mobile station 110 includes an interface 131 to communicate wirelessly with the base station 100.

The base station 100 is connected to a serving and/or packet data network (PDN) gateway 112, which terminates the user plane interface toward the enhanced node B and assumes the responsibility for packet routing and transfer towards an external network 114, which can be a packet data network such as the Internet or other type of network.

The arrangement depicted in FIG. 1 is provided for purposes of example. In other implementations, other wireless network arrangements are used.

As noted above, an advanced version of the LTE standard has proposed performing carrier aggregation to provide a larger bandwidth. Typically, an LTE component carrier (or more simply "carrier") supports bandwidth up to 20 megahertz (MHz). However, by aggregating multiple carriers together, a larger overall bandwidth can be provided for wireless communications with mobile stations by a base station. The aggregated carriers can be contiguous carriers, or alternatively, the aggregated carriers do not have to be contiguous.

Note that LTE-advanced mobile stations are able to employ aggregated carriers for performing wireless communications with base stations. Legacy LTE mobile stations are only able to employ one carrier.

Figure 2:
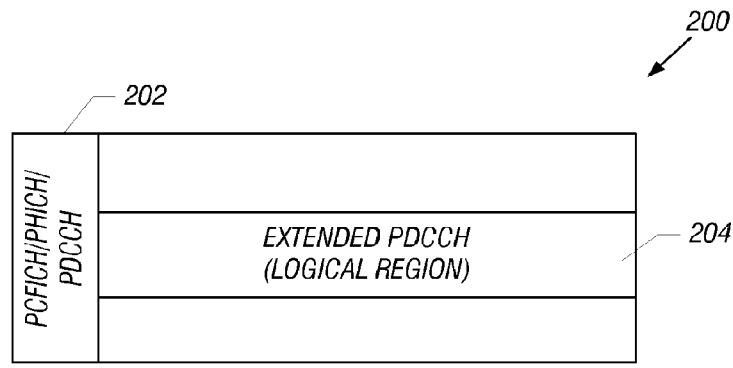
FIG. 2 illustrates an example frame structure that incorporates a legacy physical downlink control channel (PDCCH) and an extended PDCCH (E-PDCCH), according to an embodiment.

FIG. 2 shows a frame structure 200 on a particular LTE carrier. The horizontal axis of the frame structure 200 represents the time dimension (time slots), while the vertical axis of the frame structure 200 represents the frequency dimension (subcarriers of different frequencies). The frame structure 200 includes a first region 202 that contains various control information, including the legacy (primary) PDCCH. In addition to legacy PDCCHs, the region 202 could include one or multiple primary PDCCHs. Each primary PDCCH provides the control information for one mobile station or a group of mobile stations. In addition, in the example of FIG. 2, the region 202 also includes a physical control format indicator channel (PCFICH) and a physical hybrid automatic repeat request indicator channel (PHICH). In other implementations, the region 202 can include other types of control channels.

In accordance with some embodiments, the frame structure 200 also includes another region 204 that includes the E-PDCCH that contains additional control information. The region 204 may include one or multiple E-PDCCHs. Each E-PDCCH is to provide additional control information for one mobile station or a group of mobile stations. A primary PDCCH on another carrier can identify the location and size of the E-PDCCH in the region 204 of the frame structure 200. Similarly, the primary PDCCH in the region 202 of the frame structure 200 can identify the location and size of an E-PDCCH on another carrier.

Since the primary PDCCH informs the mobile station the location and size of the E-PDCCH on another carrier, the mobile station is able to decode the E-PDCCH without blind decoding. The primary PDCCH could also be used to indicate the E-PDCCH on the same carrier.

FIGS. 3 and 4 depict two alternative embodiments of implementing the primary PDCCH and E-PDCCH. In the FIG. 3 embodiment, a particular primary PDCCH (e.g., primary PDCCH 302 in a frame structure 200B) on a first carrier can refer to multiple E-PDCCHs 306A, 306B, 306C, in respective E-PDCCH regions 304A, 304B, and 304C of respective frame structures 200A, 200B, 200C that are carried in corresponding carriers. Specifically, the primary PDCCH 302 can identify the location and size of the E-PDCCH 306A, identify the location and size of the second E-PDCCH 306B, and identify the location and size of the E-PDCCH 306C. Each of the E-PDCCHs 306A, 306B, and 306C is identified by a carrier number, location information, and size information.

In one example, the primary PDCCH can have the following format:

{Carrier #1, E-PDCCH location and size in E-PDCCH region;

Carrier #2, E-PDCCH location and size in E-PDCCH region;

. . .

Carrier #M, E-PDCCH location and size in E-PDCCH region};

where M is the number of carriers supported by the system, or the number of carriers supported/configured by the base station. With this option, a separate E-PDCCH is provided per component carrier, such that each E-PDCCH indicates the resource assignment on the corresponding individual carrier.

FIG. 4 shows another option, in which the primary PDCCH 302 on one carrier (carrying frame structure 200B) points to only one E-PDCCH 306C in another (or the same) carrier. The format of the primary PDCCH in this example is as follows:

{Carrier ID, E-PDCCH location and size in E-PDCCH region}

In this example, the primary PDDCH points the mobile station to the E-PDCCH in just one carrier. The E-PDCCH on this carrier indicates the resource assignment across all carriers (i.e., one joint E-PDCCH for all carriers).

To save the mobile power consumption, the mobile station typically monitors an anchor carrier. When the mobile station detects the primary PDCCH on the anchor carrier, the mobile station turns on its transceivers on non-anchor carriers and further detects the E-PDCCHs on multiple carriers. To accommodate the transition time for the mobile station to turn on the transceivers, the E-PDCCHs could be in a subframe which is a few subframes later than the subframe containing the primary PDCCH.

To allow for the mobile station to know the resource allocation (location and size) of an E-PDCCH region, one of several options can be used. In a first option, the location of the starting resource block (RB) and the number of RBs of the E-PDCCH region is indicated. In the case where distributed virtual RB (DVRB) is used, in which case the RBs that are allocated are not contiguous, then a gap value can also be specified.

In a second option, the number of RBs of the E-PDCCH region can be specified; however, the starting RB is not explicitly specified. The mobile station finds the starting RB location of the E-PDCCH region using a predefined frequency hopping pattern that can be a function of a cell identifier and a subframe index. An LTE subframe is a portion of an LTE frame, where an LTE frame has a predefined overall time length that is divided into a predefined number of time slots. An LTE frame is made up of multiple subframes, where an LTE subframe can include some predefined number of the time slots (e.g., two slots) of the LTE frame. The subframe index identifies the particular subframe within the overall frame.

For the base station 100 (FIG. 1) to signal to the mobile station the resource allocation of the E-PDCCH region, several options can be used. In a first option, a predefined DCI format is defined to indicate the resource allocation of the E-PDCCH region on each component carrier. This predefined DCI format is provided in the legacy PDCCH region. Also, the CRC (cyclic redundancy check) of the predefined DCI format can be scrambled using a predefined RNTI (radio network temporary identifier) such that only LTE-advanced mobile stations with LTE-advanced multi-carrier capability are able to decode the predefined DCI format. In some implementations, this predefined RNTI is referred to as LTE-A-RNTI. In other implementations, other scrambling schemes or coding schemes can be applied to specify the predefined DCI format such that only LTE-advanced mobile stations that have multi-carrier capability can decode the predefined DCI format. Note that a legacy LTE mobile station that does not support multiple carriers would not be able to decode this predefined DCI format.

In a different option, the base station 100 can use higher layer signaling, such as RRC (radio resource control) signaling, SIB (system information block) signaling, and so forth, to carry the resource allocation of the E-PDCCH region on each component carrier.

FIG. 5 illustrates an embodiment different from the FIG. 3 and FIG. 4 embodiments, in which a carrier pointer message 502 is provided in a legacy PDCCH region that is on the anchor carrier 504 for the mobile station 110. The carrier pointer message in the anchor carrier 504 indicates to the mobile station 110 the non-anchor carrier (e.g., carrier 506) that the mobile station needs to monitor the PDCCH. Usually, the mobile station would monitor its anchor carrier only. When there are resource allocations on non-anchor carrier(s), the base station 100 sends a carrier pointer message (such as the carrier pointer message 502 on the PDCCH of the anchor carrier 504), which is decoded by the mobile station such that the mobile station can monitor the PDCCH of the non-anchor carrier(s), such as non-anchor carrier 506, in the next subframe. The carrier pointer message can also be used to indicate the mobile station to monitor the PDCCHs on both anchor and non-anchor carriers.

Although FIG. 5 shows a one subframe delay between the carrier pointer message 502 and decoding of PDCCH on a non-anchor carrier, a different embodiment may allow the mobile station 110 to decode the PDCCH on the non-anchor carrier in the same subframe.

Some benefits may be provided by some embodiments of the invention. The downlink control structure can be used for both contiguous and non-contiguous spectrum aggregation. To save power, the mobile station monitors the downlink control structure of its anchor carrier only, and turns on other component carriers as necessary.

There is limited blind decoding by a mobile station, and no blind decoding for E-PDCCH due to explicit signaling of location and size of E-PDCCH. With E-PDCCH, it is convenient to support new DCI formats for LTE-advanced features of relatively large payload size. Also, the new compact DCI format of the primary PDCCH used to indicate the E-PDCCH is not expected to have a large payload size, such that it should not overload the legacy PDCCH region. The E-PDCCH may achieve better performance than legacy PDCCH, since inter-cell interference can be better controlled on E-PDCCH as it is easier to avoid E-PDCCH collision from neighboring cells.

The E-PDCCH provides control information over the physical downlink shared channel (PDSCH), which is a downlink traffic channel from the base station to the mobile station. The information format of the E-PDCCH can be as follows. The E-PDCCH can include a component carrier number (to identify the associated carrier), resource allocation for data, MCS information, HARQ process information, uplink power control information, and other control information.

The reserved resource blocks (RBs) of the E-PDCCH can be divided into resource element groups (REGs) and control channel elements (CCEs) that can be used for signaling to different mobile stations. The compact DCI format of the primary PDCCH carries information on the REGs and/or CCEs to be used by mobile stations. An index to the starting REG and the length of the allocated REGs are specified. The index can be a physical REG index or a logical REG index. In the case of the logical REG index, the mapping of logical to physical REGs can be determined through a random permutation that can be a function of the cell identifier.

Figure 6:
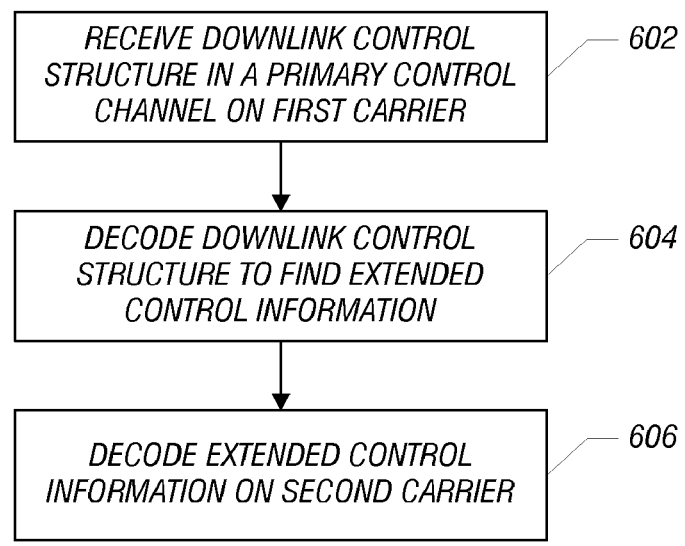
FIG. 6 is a flow diagram of the process of obtaining control information by a mobile station, according to an embodiment.

FIG. 6 is a flow diagram of a process of wireless communications according to an embodiment. The tasks of FIG. 6 can be performed by a mobile station. The mobile station receives (at 602) a downlink control structure in a primary control channel in the legacy PDCCH region in a first carrier. The downlink control structure identifies the location and size of extended control information on at least a second different carrier. The mobile station decodes (at 604) the downlink control structure to find the extended control information, such as the E-PDCCH. The extended control information on the second carrier is decoded (at 606) by the mobile station, such that the mobile station is able to retrieve the control information to be used by the mobile station for performing wireless communications.

Instructions of software described above (including software 126 and 134 of FIG. 1) are loaded for execution on a processor (such as one or more CPUs 122 and 130 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A mobile station, comprising:
wireless communication circuitry, configured to perform wireless communication with at least a base station; and
processing hardware coupled to the wireless communication circuitry, wherein the processing hardware is configured to operate with the wireless communication circuitry to:
receive, from a base station, control information in resource blocks (RBs) of a physical downlink shared channel region on a first component carrier among a plurality of component carriers, wherein the plurality of component carriers comprises the first component carrier and a second component carrier, wherein the physical downlink shared channel region is located within orthogonal frequency division multiplexing (OFDM) symbols following a physical downlink control channel region in a subframe, wherein the second component carrier is different than the first component carrier, wherein the control information indicates a resource assignment for the mobile station on the second component carrier, and wherein the second carrier is identified in the control information of the first component carrier by a component carrier number; and
communicate with the base station using the control information of the first component carrier and the resource assignment on the second component carrier.

2. The mobile station of claim 1,
wherein the processing hardware is further configured to operate with the wireless communication circuitry to:
receive, from the base station, higher layer signaling indicating information for locating control information on at least the first component carrier among the plurality of component carriers.

3. The mobile station of claim 1,
wherein each component carrier among the plurality of component carriers appears as a Long-Term Evolution (LTE) carrier.

4. The mobile station of claim 1,
wherein each component carrier among the plurality of component carriers has a separate physical downlink control channel (PDCCH), physical control format indicator channel (PCFICH), and physical hybrid automatic repeat request indicator channel (PHICH).

5. The mobile station of claim 1,
wherein to communicate with the base station, the processing hardware is further configured to operate with the wireless communication circuitry to receive data from the base station using both the first carrier and the second carrier.

6. The mobile station of claim 1,
wherein the processing hardware is further configured to operate with the wireless communication circuitry to communicate with the base station to establish carrier aggregation of the plurality of carriers for the mobile station.

7. The mobile station of claim 1,
wherein the first and second carriers are non-contiguous.

8. The mobile station of claim 1,
wherein the processing hardware is further configured to operate with the wireless communication circuitry to receive a downlink control structure from the base station that indicates that the control information is on the first carrier;
wherein receiving the control information is based on the downlink control structure.

9. The mobile station of claim 1,
wherein the RBs are divided into resource element groups (REGs) and control channel elements (CCEs) that are configured for signaling to a plurality of mobile stations.

10. A non-transitory, computer accessible memory medium storing program instructions executable by a processor of a mobile station to:
receive, from a base station, control information in resource blocks (RBs) of a physical downlink shared channel region on a first component carrier among a plurality of component carriers, wherein the plurality of component carriers comprises the first component carrier and a second component carrier, wherein the physical downlink shared channel region is located within orthogonal frequency division multiplexing (OFDM) symbols following a physical downlink control channel region in a subframe, wherein the second component carrier is different than the first component carrier, wherein the control information indicates a resource assignment for the mobile station on the second component carrier, and wherein the second carrier is identified in the control information of the first component carrier by a component carrier number; and
communicate with the base station using the control information of the first component carrier and the resource assignment on the second component carrier.

11. The non-transitory, computer accessible memory medium of claim 10,
wherein the program instructions are further executable to receive, from the base station, higher layer signaling indicating information for locating control information on at least the first component carrier among the plurality of component carriers.

12. The non-transitory, computer accessible memory medium of claim 10,
wherein each component carrier among the plurality of component carriers appears as a Long-Term Evolution (LTE) carrier.

13. The non-transitory, computer accessible memory medium of claim 10,
wherein each component carrier among the plurality of component carriers has a separate physical downlink control channel (PDCCH), physical control format indicator channel (PCFICH), and physical hybrid automatic repeat request indicator channel (PHICH).

14. The non-transitory, computer accessible memory medium of claim 10,
wherein to communicate with the base station, the program instructions are further executable to receive data from the base station using both the first carrier and the second carrier.

15. The non-transitory, computer accessible memory medium of claim 10,
wherein the program instructions are further executable to communicate with the base station to establish carrier aggregation of the plurality of carriers for the mobile station.

16. A method for wireless communication, comprising: a mobile station,
receiving, from a base station, control information in resource blocks (RBs) of a physical downlink shared channel region on a first component carrier among a plurality of component carriers, wherein the plurality of component carriers comprises the first component carrier and a second component carrier, wherein the physical downlink shared channel region is located within orthogonal frequency division multiplexing (OFDM) symbols following a physical downlink control channel region in a subframe, wherein the second component carrier is different than the first component carrier, wherein the control information indicates a resource assignment for the mobile station on the second component carrier, and wherein the second carrier is identified in the control information of the first component carrier by a component carrier number; and
performing communication with the base station using the control information of the first component carrier and the resource assignment on the second component carrier.

17. The method of claim 16, further comprising:
the mobile station,
receiving, from the base station, higher layer signaling indicating information for locating control information on at least the first component carrier among the plurality of component carriers.

18. The method of claim 16,
wherein each component carrier among the plurality of component carriers appears as a Long-Term Evolution (LTE) carrier.

19. The method of claim 16,
wherein each component carrier among the plurality of component carriers has a separate physical downlink control channel (PDCCH), physical control format indicator channel (PCFICH), and physical hybrid automatic repeat request indicator channel (PHICH).

20. The method of claim 16,
wherein the RBs are divided into resource element groups (REGs) and control channel elements (CCEs) that are configured for signaling to a plurality of mobile stations.

* * * * *